Reissued Feb. 23, 1932

Re. 18,355

UNITED STATES PATENT OFFICE

CLARENCE M. CARSON, OF CUYAHOGA FALLS, OHIO, ASSIGNOR TO THE GOODYEAR TIRE & RUBBER COMPANY, OF AKRON, OHIO, A CORPORATION OF OHIO

GASPROOF BALLOON FABRIC

No Drawing. Original No. 1,779,389, dated October 21, 1930, Serial No. 345,900, filed March 9, 1929. Application for reissue filed January 15, 1932. Serial No. 586,947.

This invention relates to the treatment of fabrics employed in the construction of gas cells for lighter-than-air craft, and it has particular relation to the provision of an impermeable coating for such fabrics.

One object of the invention is to provide a coating material which may be readily applied to the fabric by spraying or spreading with a brush or spreading machine.

Another object of the invention is to provide a coating material for fabric which is highly flexible, impermeable to inflating gases, and which withstands the attacks of weathering agencies for a relatively long period of time.

Heretofore in the construction of gas cells for lighter-than-air craft, it has been customary to coat the fabric employed with a relatively impermeable material, such as rubber or gold beater's skin, in order to render them effectual as gas retaining media. The former material was inexpensive to procure and to apply. However, the rate of diffusion of hydrogen and helium through this material was comparatively great. Accordingly, it was not ordinarily used in large air craft of the Zeppelin type, because of the unduly rapid rate of loss of gas which its use entailed. Gold beater's skin, a relatively thin membrane obtained from the viscera of cattle, has been extensively employed as a gas proofing medium in the larger type of air craft. This material is quite light, flexible, durable and it also offers great resistance to diffusion of the gas enclosed by the fabric. However, it is obtained in relatively small pieces whose initial cost is great, and which can be attached to the fabric only by an extremely slow and laborious process involving the cementing of each individual piece to the fabric by manual labor.

It has been proposed to substitute various lacquers and varnishes, such as those obtained from cellulose ester, for the older and more commonly known gold beater's skin or rubber coatings. These materials were undesirable in actual practice in some cases because they did not offer sufficient resistance to the diffusion of such light and highly diffusible gases as hydrogen or helium. In other cases they either did not adhere properly to the fabric or they were not sufficiently flexible to withstand the relatively severe flexure to which gas cell fabrics are subjected without cracking or checking.

This invention consists in the discovery that a mixture of vulcanized latex and gelatin, together with certain other ingredients, constitutes a highly satisfactory coating media for fabrics employed in the construction of lighter-than-air craft gas cells. In practicing the invention, a relatively thin cement comprising latex, gelatin or glue, together with a plasticizer, such as glycerol or Turkey red oil, is sprayed or spread upon the fabric (preferably a light, strong, closely woven material) in a plurality of thin films or sheets. The number of coats, of course, may be varied as desired, although for most purposes it is found that eight or ten applications are sufficient. After these coatings have been applied, the whole is finished by the application of a flexible varnish which is finally dusted with an aluminum powder in order to render the fabric impermeable to light and also to increase electrical conductivity thereof.

Substantially any of the ordinary processes may be employed in the vulcanization of the latex used in the new coating composition. For example, a latex vulcanized by means of two or three percent of sulfur, one percent of the diethyl amine salt of mercapto benzothiazole and two to five percent of zinc oxide at normal room temperatures and pressures has been found to be satisfactory. The proportions of the various ingredients employed in the material may be varied within relatively wide limits without departing from the spirit of the invention. The following is an example of a formula which has been found to be entirely satisfactory:

| | |
|---|---|
| Gelatin | 25 grams |
| Glycerol | 50 grams |
| Vulcanized latex (containing 30% of rubber) | 100 cc. |
| Water | 500 cc. |

This material may be permanently applied to the fabric without the application of heat.

It is also extremely impermeable to gas, actual tests indicating a diffusion of less than one liter of hydrogen per square meter within a period of 24 hours. It is quite flexible and retains the latter property at the low temperatures which exist at high altitudes.

Furthermore, the use of vulcanized latex prevents the film from being washed off by water and aids in making the gelatin insoluble.

Although I have described in detail only the preferred embodiments of the invention, it will be apparent to those skilled in the art that the invention is not so limited, but that various modifications may be made therein without departing from the spirit of the invention or from the scope of the appended claims.

What I claim is:

1. A method of treating balloon fabric which comprises coating it with a mixture of gelatin and vulcanized latex.

2. A method of treating balloon fabric which comprises coating it with a mixture of gelatin and vulcanized latex containing a plasticizer.

3. A method of treating balloon fabric which comprises coating it with a mixture of gelatin and vulcanized latex containing glycerol.

4. A method of treating balloon fabrics which comprises coating them with a plurality of films of a thin cement comprising water, gelatin, vulcanized latex and a plasticizing agent.

5. A gas cell for lighter-than-air craft comprising a light closely woven fabric which is coated with a mixture of gelatin and vulcanized latex.

6. A gas cell for lighter-than-air craft which is constructed of a light closely woven fabric which is coated with a material comprising gelatin, vulcanized latex and a plasticizer.

7. A gas cell for lighter-than-air craft which has been constructed of a light closely woven fabric having a coating comprising gelatin, vulcanized latex and glycerine.

8. A gas cell for lighter-than-air craft which has been constructed of light closely woven fabric coated with a plurality of films of a material comprising gelatin, vulcanized latex, and a plasticizer.

In witness whereof, I have hereunto signed my name.

Signed at Akron, in the county of Summit and State of Ohio, U. S. A., this 13th day of January, 1932.

CLARENCE M. CARSON.